Patented June 27, 1939

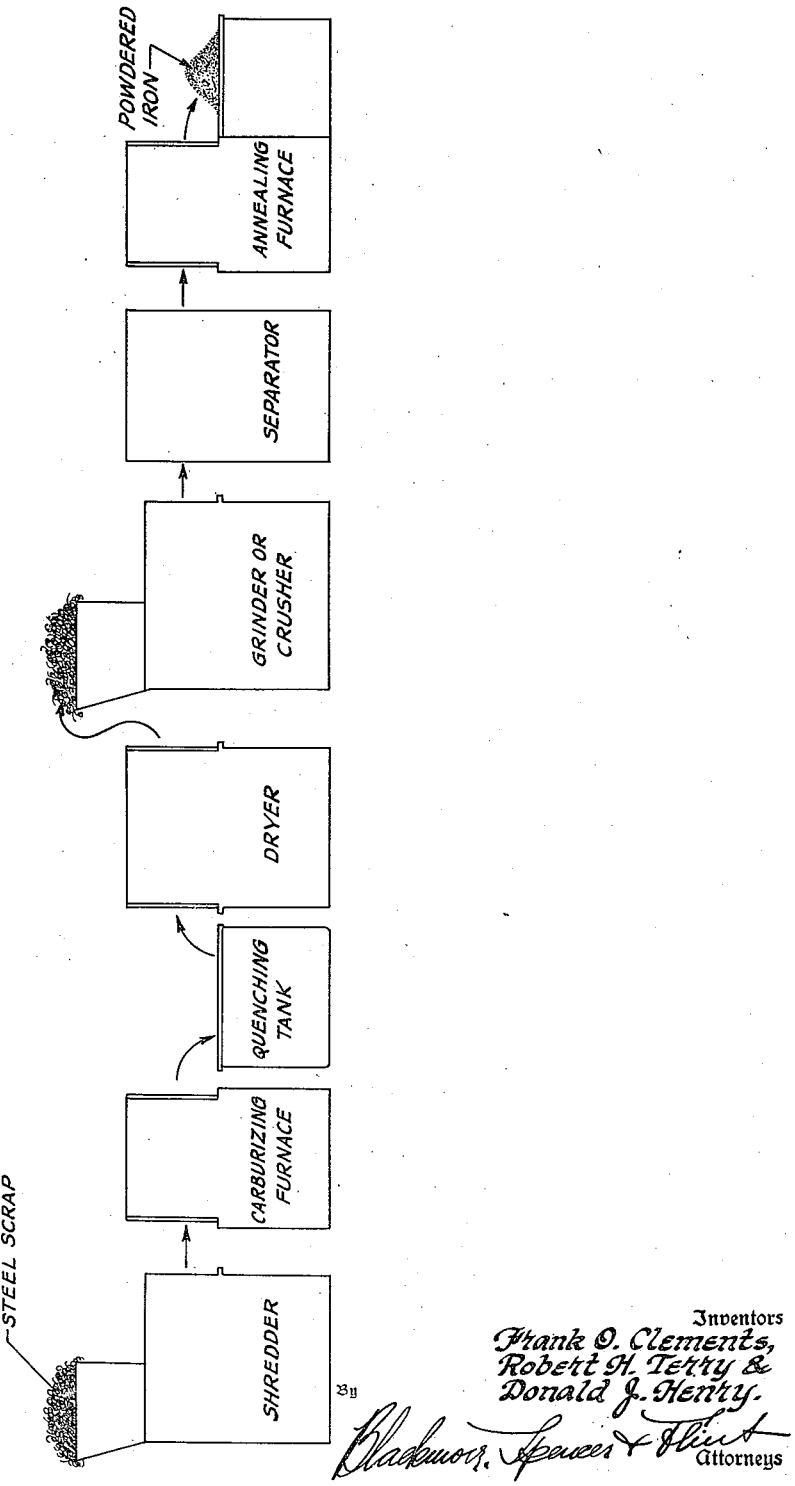

2,164,198

UNITED STATES PATENT OFFICE 2,164,198

METHOD OF MAKING POWDERED IRON

Frank O. Clements, Robert H. Terry, and Donald J. Henry, Detroit, Mich., assignors to General Motors Corporation, Detroit, Mich., a corporation of Delaware Application May 5, 1938, Serial No. 206,234

5 Claims. (Cl. 148—4)

This invention has to do with a method of making iron powder. The method is economical and is capable of being controlled so that the powder produced by it may have any degree of hardness, carbon content or fineness desired.

The method consists in carburizing iron or steel throughout and then quenching it from above the critical temperature to render it brittle. The iron or steel is preferably reduced to small pieces prior to carburization to promote the carburizing action. While the metal so treated is very hard it is so brittle and friable that it may be readily crushed or ground to a powder.

The resulting powder is satisfactory for many uses but where it is desired to form articles out of the material by pressing, it is preferred to give the material further treatment to increase the cohesiveness of the particles. This may be done by annealing it in a suitable oven having a non-oxidizing or reducing atmosphere to soften it without decreasing the carbon content or it can be annealed in moist hydrogen to decrease the carbon content to the extent desired and at the same time reduce any oxides formed during quenching. The softened particles are readily deformed and hold together when dry pressed.

The process may be carried out by means of many kinds of apparatus. The drawing is a flow diagram showing schematically an arrangement of apparatus especially suitable for the production of powdered iron from steel scrap.

The raw material may be any kind of iron or steel which is capable of being carburized. It is cheapest to use scrap and the most suitable kind of scrap consists of the chips and turnings resulting from machining operations. Variations in analysis of the iron or steel found in such scrap are of little consequence for most uses of the powder.

It will usually be necessary to continue carburization until the carbon penetrates all the way through the metal and so that this may not take too long it will be found desirable to use nothing but thin chips or turnings and if the scrap contains pieces of greater thickness these may be readily separated from the rest by employing some sort of gravity or centrifugal separation or by passing the scrap through suitable disintegrating or shredding apparatus indicated on the drawing which reduces the metal to the desired size.

Next the metal is passed through a carburizing furnace, preferably of the muffle type, in which it is subjected to the action of a carburizing gas or carburizing compound. Natural gas or any suitable commercial gas may be used. The carburizing treatment should continue until carbon penetrates through the chips and turnings and is present in sufficient quantity to make the metal very brittle after quenching.

The carburized metal is now suddenly cooled in any suitable manner to harden it and make it brittle. This may be conveniently done by quenching in oil or water and we have indicated on the drawing a quenching tank through which the carburized material is passed. The resulting product will be found to be very hard and friable.

Next the material is passed through a drier in which the moisture is carried off, and then through a suitable crushing mill or grinder as indicated in which the brittle carburized material is reduced to a fine powder. The pulverized material may then be passed through a suitable separator, and thus sorted according to size and, if desired, some or all of it may be subjected to further treatment as by running it through another crushing mill or by grinding in a ball mill or the like to increase its fineness.

The resulting product will be found to be very hard and difficult to shape by dry pressing because the particles cannot be deformed by the use of ordinary pressures and so will not cohere. To overcome this difficulty the material is now annealed by passing it through a suitable annealing furnace in which the material is protected by a neutral or reducing atmosphere. A hydrogen atmosphere has proven very satisfactory. The reducing atmosphere removes any oxides that may be present and, depending upon its composition, also reduces the carbon content to the amount desired. The annealing operation leaves the material soft so that it may be readily deformed and dry pressing may be successfully used to make articles from the powder.

The character and time of treatment will, of course, vary somewhat with the material treated and the purposes for which it is to be used, and no difficulty will be experienced in making such minor adjustments. As a specific example of the application of the invention, we have successfully made satisfactory iron powder of a high degree of purity from machine shop chips and turnings not exceeding about .035" in thickness using the following specific treatment. Carburizing was carried out in a rotary, muffle type of carburizing furnace. Natural gas was used for carburizing. Carburizing was continued for from 1 to 3 hours at a temperature of around 1700° F. The scrap turnings analyzed about .20 to .40% carbon, although it would have been equally usable with greater or less amounts of carbon. The time of treatment was determined by the time required for the carbon to penetrate through the thickest pieces, preferably until the carbon content was about .8% or more at the center of each piece.

The material was cooled by quenching in water to make it hard and brittle. It was then ground in a ball mill to the desired degree of fineness.

The crushed material was annealed for half an hour to an hour at 1500° to 1700° F. in an atmosphere of hydrogen. Annealing is preferably done in a revolving pot to insure that all of the pulverized material receives the same treatment.

The resulting material consists of a mixture of angularly shaped particles that cohere very well when pressed together. It contains very little foreign matter.

An advantage of this method of making iron powder is the fact that any desired degree of hardness or carbon content may be obtained by controlling the steps of the process. The product is exceptionally free of oxides and foreign matter. The cost of the raw material is very low and the whole operation may be carried on automatically if desired, the raw material being fed in at one end and the sorted powders taken out at the other using conventional conveyors to carry the material through the equipment in the order indicated on the drawing.

For brevity the word "iron" is used in the following claims to cover all forms of iron and steel, whether plain or alloyed, that can be carburized.

We claim:

1. The method of making powdered iron which consists in carburizing iron, rapidly cooling it to make it brittle, breaking it up into particles of the desired size, and annealing the particles to make them relatively soft and briquettable.

2. The method of making powdered iron which consists in carburizing iron, rapidly cooling it to make it brittle, breaking it up into particles of the desired size, and annealing the particles in a reducing atmosphere to make them relatively soft and briquettable while maintaining them free from oxidation.

3. The method of making powdered iron which consists in preparing iron in the form of pieces of small thickness, carburizing the pieces all the way through, rapidly cooling them to make them brittle, and breaking them up into particles of the desired size and annealing the particles to make them relatively soft and briquettable.

4. A method of making iron powder, comprising the steps of, increasing the carbon content of iron while the iron is hot, rapidly cooling the iron so as to make the iron brittle, comminuting the high carbon iron to the desired size, and then annealing the comminuted iron particles under decarburizing conditions for reducing the carbon content thereof and for softening the particles.

5. A method of making iron powder, comprising the steps of, increasing the carbon content of iron while the iron is hot, rapidly cooling the iron so as to make the iron brittle, breaking up said brittle iron into very fine particles of predetermined size by ball-milling the iron, and then decarburizing the iron particles under suitable conditions for reducing the carbon content thereof and for softening the particles.

FRANK O. CLEMENTS.
ROBERT H. TERRY.
DONALD J. HENRY.